United States Patent
Hsieh et al.

(10) Patent No.: US 8,854,497 B2
(45) Date of Patent: Oct. 7, 2014

(54) WEBCAM CAPABLE OF GENERATING SPECIAL SOUND EFFECTS AND METHOD OF GENERATING SPECIAL SOUND EFFECTS THEREOF

(75) Inventors: Hong-Yeh Hsieh, Taipei (TW); Ching-Hung Kuo, Miaoli County (TW); Chun-Hsien Hsieh, Taipei (TW); Yuan-Chang Chien, Taipei (TW); Chih-Kao Chen, New Taipei (TW)

(73) Assignee: Etron Technology, Inc., Hsinchu (TW)

( * ) Notice: Subject to any disclaimer, the term of this patent is extended or adjusted under 35 U.S.C. 154(b) by 209 days.

(21) Appl. No.: 13/337,158

(22) Filed: Dec. 26, 2011

(65) Prior Publication Data
US 2012/0176511 A1    Jul. 12, 2012

Related U.S. Application Data

(60) Provisional application No. 61/431,060, filed on Jan. 10, 2011.

(30) Foreign Application Priority Data

Apr. 14, 2011  (TW) .............................. 100112944 A

(51) Int. Cl.
| | | |
|---|---|---|
| H04N 5/76 | (2006.01) | |
| G10H 1/00 | (2006.01) | |
| G10H 1/08 | (2006.01) | |
| H04N 21/4223 | (2011.01) | |
| H04N 21/434 | (2011.01) | |
| H04N 21/4363 | (2011.01) | |

(52) U.S. Cl.
CPC ....... *H04N 21/4223* (2013.01); *H04N 21/4344* (2013.01); *H04N 21/43632* (2013.01)
USPC ............................. 348/231.4; 84/615; 84/625

(58) Field of Classification Search
CPC ..................... H04N 5/772; H04N 2201/3264; G10H 1/0008
USPC ........ 348/231.4, 222.1; 345/156; 84/615, 625
See application file for complete search history.

(56) References Cited

U.S. PATENT DOCUMENTS

| | | | |
|---|---|---|---|
| 8,487,176 B1 * | 7/2013 | Wieder | 84/615 |
| 2003/0206739 A1 | 11/2003 | Lu | |
| 2006/0277571 A1 * | 12/2006 | Marks et al. | 725/37 |
| 2007/0168819 A1 | 7/2007 | Buhe | |
| 2010/0245624 A1 * | 9/2010 | Beaucoup | 348/231.4 |

FOREIGN PATENT DOCUMENTS

| | | |
|---|---|---|
| CN | 1406055 A | 3/2003 |
| CN | 1622599 | 6/2005 |

(Continued)

*Primary Examiner* — Twyler Haskins
*Assistant Examiner* — Quang Le
(74) *Attorney, Agent, or Firm* — Winston Hsu; Scott Margo

(57) ABSTRACT

A webcam capable of generating special sound effects includes an image device, a sound device, a multiplexer, a microprocessor, and a universal serial bus device. The image device is used for capturing and processing an image to generate a processed image. The sound device is used for capturing and processing sound to generate processed sound. The multiplexer is coupled to the image device and the sound device for receiving the processed image and the processed sound. The microprocessor is used for controlling the image device and the sound device. The universal serial bus device is used for controlling the multiplexer to read the processed image from the image device and read the processed sound from the sound device according to a command of a host, and transmitting the processed image and the processed sound to the host.

17 Claims, 5 Drawing Sheets

(56) References Cited

FOREIGN PATENT DOCUMENTS

| | | | |
|---|---|---|---|
| CN | 1902845 A | | 1/2007 |
| CN | 201204648 Y | | 3/2009 |
| CN | 201541303 U | | 8/2010 |
| TW | 532045 | | 5/2003 |
| TW | 550948 | | 9/2003 |

* cited by examiner

US 8,854,497 B2

WEBCAM CAPABLE OF GENERATING SPECIAL SOUND EFFECTS AND METHOD OF GENERATING SPECIAL SOUND EFFECTS THEREOF

CROSS REFERENCE TO RELATED APPLICATIONS

This application claims the benefit of U.S. Provisional Application No. 61/431,060, filed on Jan. 10, 2011 and entitled "WEBCAM plus Sound Effects," the contents of which are incorporated herein by reference.

BACKGROUND OF THE INVENTION

1. Field of the Invention

The present invention is related to a webcam capable of generating special sound effects and a method of generating special sound effects by a webcam, and particularly to a webcam and a method that can process sound in real time to generate special sound effects.

2. Description of the Prior Art

Webcams are widely used in conjunction with communication software (such as Skype, MSN), where the webcam is used for capturing real-time images and real-time sound, and transmits the captured real-time images and real-time sound to a host through a Universal Serial Bus or the Internet. Therefore, a user can utilize the webcam to establish a video link with other users.

However, the webcam is only used for capturing real-time images and real-time sound. The host may receive and process the real-time sound to generate special sound effects, but not all hosts connected to the webcam support generation of the special sound effects. In addition, in the prior art, because the host processes the real-time sound captured by the webcam to generate the special sound effects through post-production, the webcam cannot provide real-time special sound effects for the user.

SUMMARY OF THE INVENTION

An embodiment provides a webcam capable of generating special sound effects. The webcam includes an image device, a sound device, a multiplexer, a microprocessor, and a Universal Serial Bus device. The image device is used for capturing and processing an image to generate a processed image, and storing the processed image. The sound device is used for capturing and processing sound to generate processed sound, and storing the processed sound. The multiplexer is coupled to the image device and the sound device for receiving the processed image and the processed sound. The microprocessor is coupled to the image device and the sound device for controlling the image device and the sound device. The Universal Serial Bus device is coupled to the multiplexer and the microprocessor for controlling the multiplexer to read the processed image from the image device and read the processed sound from the sound device according to a command of a host, and transmitting the processed image and the processed sound to the host.

Another embodiment provides a method of generating special sound effects by a webcam. The method includes capturing and processing an image to generate a processed image, and storing the processed image; capturing and processing sound to generate processed sound, and storing the processed sound; a multiplexer receiving the processed image and the processed sound; controlling the multiplexer to read the processed image from an image device and read the processed sound from a sound device, and transmitting the processed image and the processed sound to the host according to a command of a host.

The present invention provides a webcam capable of generating special sound effects and a method of generating special sound effects by a webcam. The webcam and the method utilize a sound processing unit to perform sound processing on sound captured and digitized by a sound capture unit to generate sound with special sound effects. The sound processing includes sound mixing, adding echoes and/or pitch shift. Therefore, whether the host supports the special sound effects or not, the present invention can add the special sound effects for a user to have more fun when the user transmits real-time images and real-time sound.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
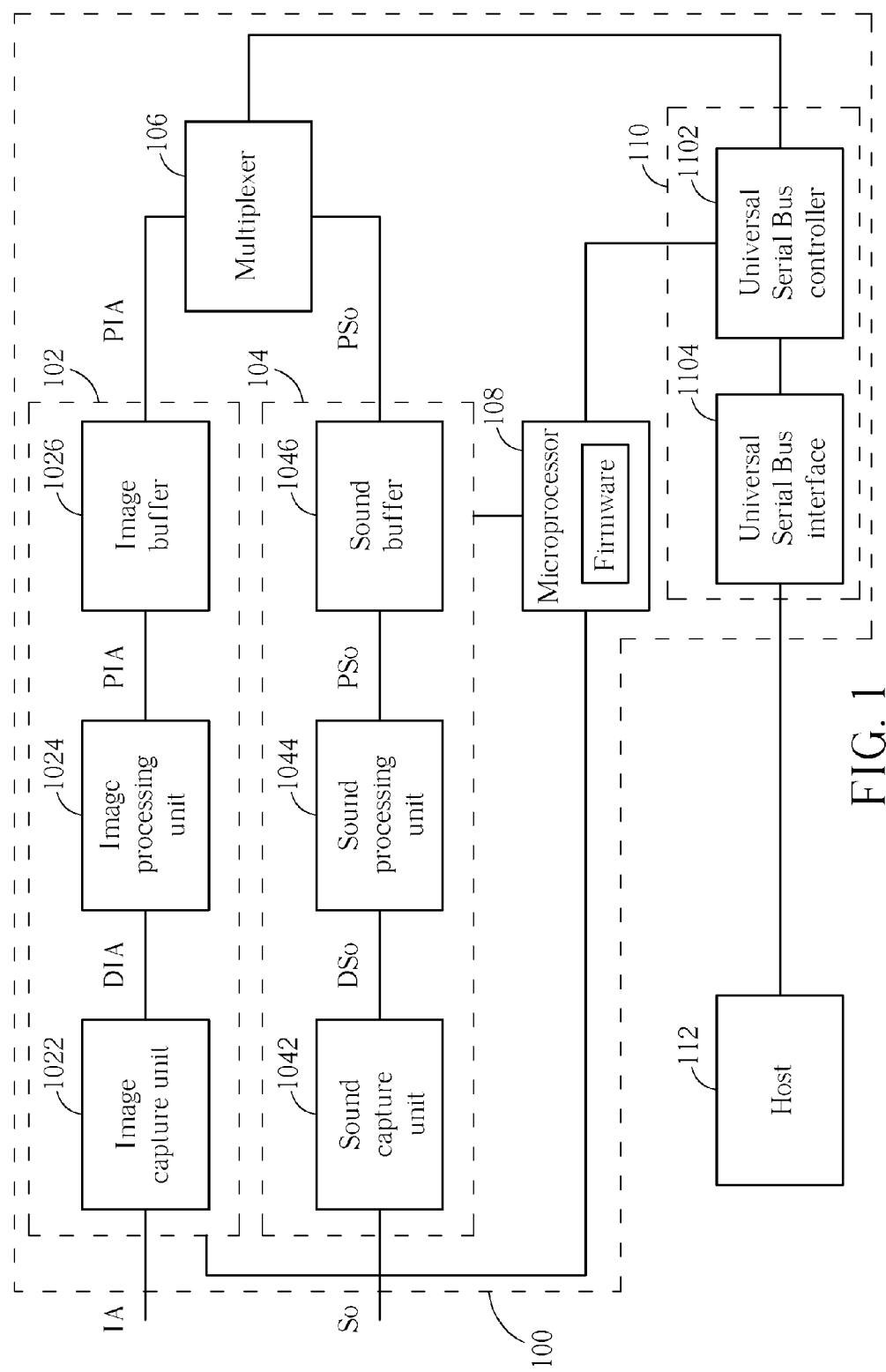
FIG. 1 is a diagram illustrating a webcam capable of generating special sound effects according to an embodiment.

Please refer to FIG. 1. FIG. 1 is a diagram illustrating a webcam 100 capable of generating special sound effects according to an embodiment. The webcam 100 includes an image device 102, a sound device 104, a multiplexer 106, a microprocessor 108, and a Universal Serial Bus (USB) device 110. The image device 102 is used for capturing and processing an image IA to generate a processed image PIA, and storing the processed image PIA. The sound device 104 is used for capturing and processing sound So to generate a processed sound PSo, and storing the processed sound PSo. The multiplexer 106 is coupled to the image device 102 and the sound device 104 for receiving the processed image PIA and the processed sound PSo. The microprocessor 108 is coupled to the image device 102 and the sound device 104 for controlling the image device 102 and the sound device 104 according to firmware stored in the microprocessor 108. The Universal Serial Bus device 110 is coupled to the multiplexer 106 and the microprocessor 108. The Universal Serial Bus device 110 includes a Universal Serial Bus controller 1102 and a Universal Serial Bus interface 1104. The Universal Serial Bus controller 1102 is used for controlling the multiplexer 106 to read the processed image PIA from the image device 102 and read the processed sound PSo from the sound device 104 according to a command of a host 112. The Universal Serial Bus interface 1104 is coupled to the Universal Serial Bus controller 1102 for transmitting the processed image PIA and the processed sound PSo to the host 112.

As shown in FIG. 1, the image device 102 includes an image capture unit 1022, an image processing unit 1024, and an image buffer 1026. The image capture unit 1022 is used for capturing and digitizing an image IA to generate a digitized image DIA, where the image capture unit 1022 is a complementary metal oxide semiconductor image sensor (CMOS image sensor) or a charge coupled device image sensor (CCD image sensor). The image processing unit 1024 is coupled to the image capture unit 1022 for performing image processing on the digitized image DIA to generate the processed image PIA. The image processing includes scaling, adjusting color, adjusting luminance, adjusting resolution, noise cancellation, edge enhancement, interpolation and/or adjusting contrast. The image buffer 1026 is coupled to the image processing unit 1024 for receiving and storing the processed image PIA.

As shown in FIG. 1, the sound device 104 includes a sound capture unit 1042, a sound processing unit 1044, and a sound buffer 1046. The sound capture unit 1042 is used for capturing and digitizing the sound So to generate the digitized sound DSo, where the sound capture unit 1042 is a combination of an analog microphone and an analog-to-digital converter, or a digital microphone. The sound processing unit 1044 is used for performing sound processing on the digitized sound DSo to generate the processed sound PSo. The sound processing includes sound mixing, adding echoes, and/or pitch shift. The sound buffer 1046 is coupled to the sound processing unit 1044 for receiving and storing the processed sound PSo.

Figure 2A:
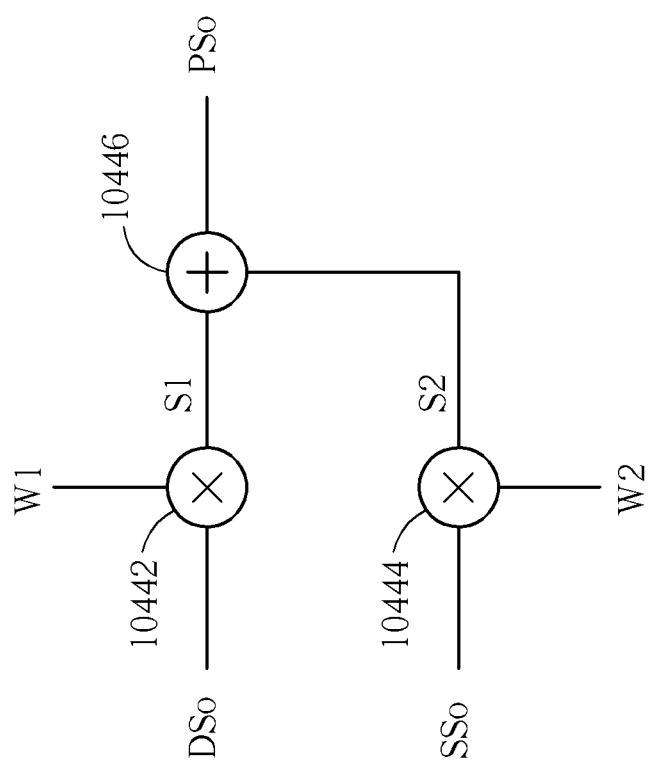
FIG. 2A is a diagram illustrating the sound processing unit performing the sound mixing on the digitized sound.
Figure 2B:
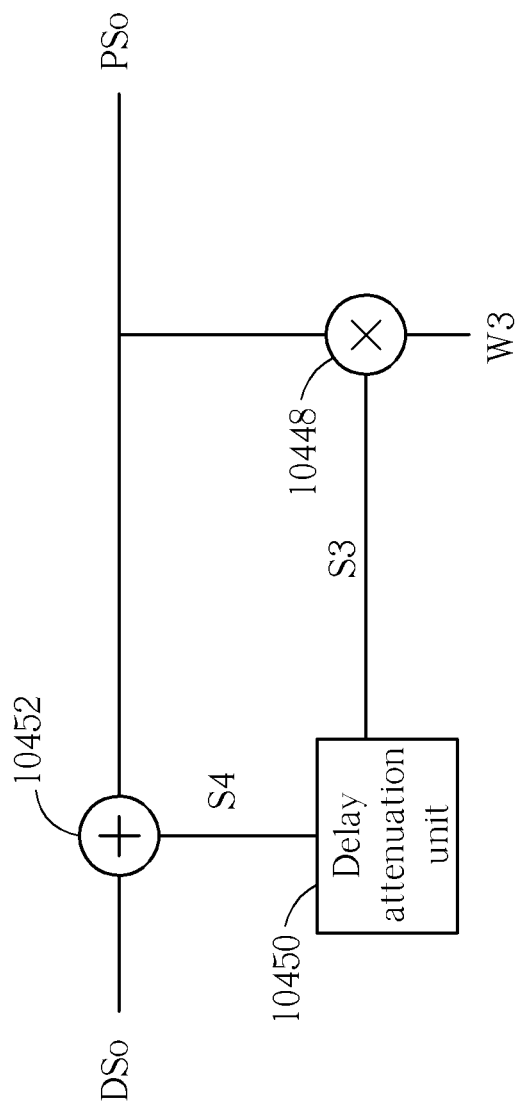
FIG. 2B is a diagram illustrating the sound processing unit performing the adding echoes on the digitized sound.
Figure 2C:
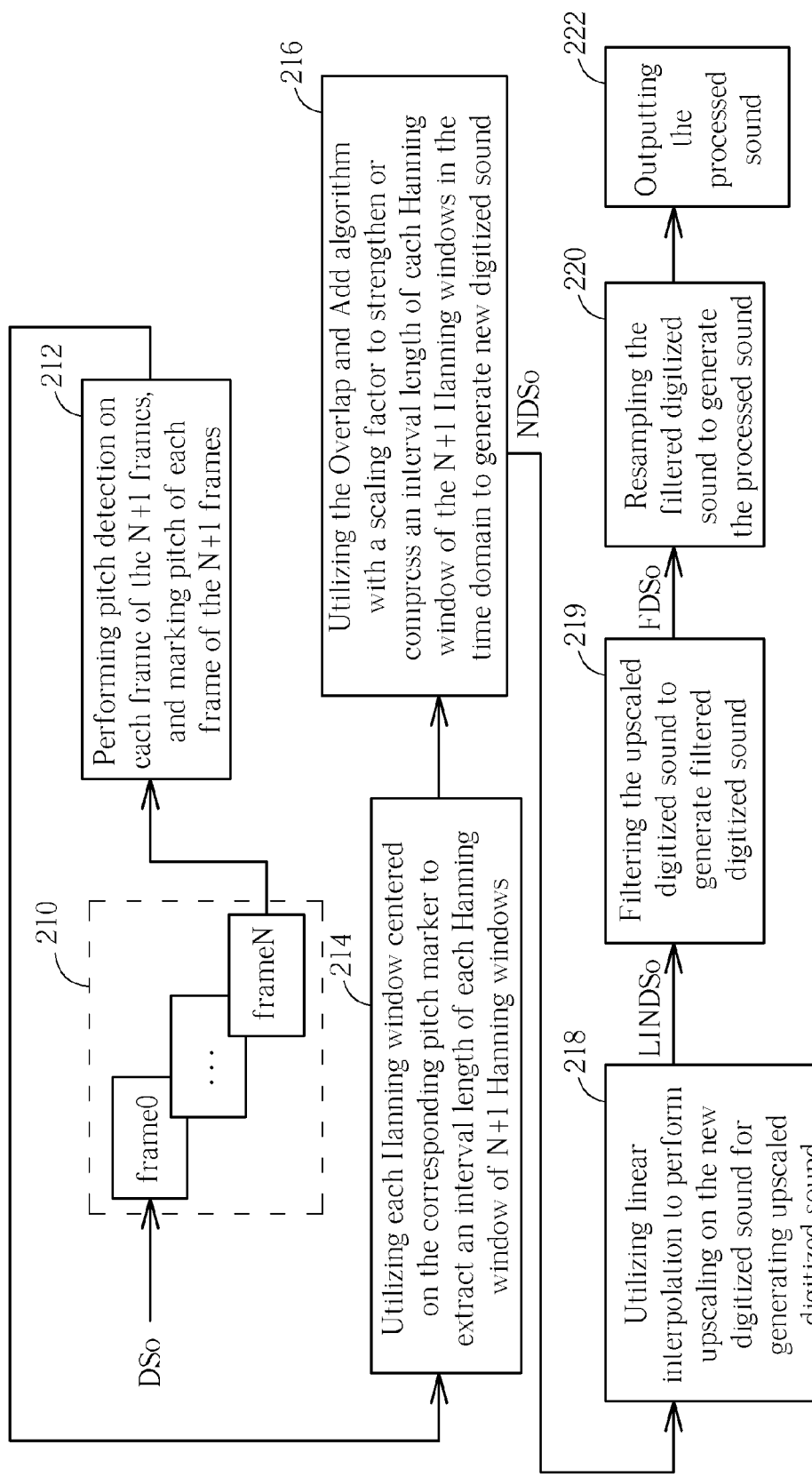
FIG. 2C is a diagram illustrating the sound processing unit performing the pitch shift on the digitized sound.

Please refer to FIG. 2A, FIG. 2B, and FIG. 2C. FIG. 2A is a diagram illustrating the sound processing unit 1044 performing the sound mixing on the digitized sound DSo, FIG. 2B is a diagram illustrating the sound processing unit 1044 performing the adding echoes on the digitized sound DSo, and FIG. 2C is a diagram illustrating the sound processing unit 1044 performing the pitch shift on the digitized sound DSo. As shown in FIG. 2A, the sound processing unit 1044 utilizes a multiplier 10442 of the sound processing unit 1044 to multiply the digitized sound DSo by a first weight W1 to generate first sound S1, and utilizes a multiplier 10444 of the sound processing unit 1044 to multiply second digitized sound SSo by a second weight W2 to generate second sound S2. The second digitized sound SSo is a special sound built into the sound processing unit 1044 or sound pre-captured by the sound capture unit 1042 at another time. Then, the sound processing unit 1044 utilizes an adder 10446 to add the first sound S1 to the second sound S2 for generating the processed sound PSo.

As shown in FIG. 2B, the sound processing unit 1044 utilizes a multiplier 10448 of the sound processing unit 1044 to multiply the processed sound PSo by a third weight W3 to generate third sound S3, and utilizes a delay attenuation unit 10450 to perform delay and attenuation on the third sound S3 to generate fourth sound S4. Then, an adder 10452 adds the fourth sound S4 to the digitized sound DSo to perform sound mixing for generating the processed sound PSo. Therefore, as shown in FIG. 2B, the processed sound PSo has an echo effect.

As shown in FIG. 2C, the sound processing unit 1044 utilizes the PSOLA algorithm to shift pitch of the digitized sound DSo, where the PSOLA algorithm shifts the pitch of the digitized sound DSo in the time domain. But, the present invention is not limited to the PSOLA algorithm. In Step 210, the digitized sound DSo is divided into N+1 frames frame0 to frameN in the time domain. In Step 212, the sound processing unit 1044 performs pitch detection on each frame of the N+1 frames frame0 to frameN, and marks pitch of each frame of the N+1 frames frame0 to frameN. In Step 214, the sound processing unit 1044 utilizes each Hanning window centered on the corresponding pitch marker to extract an interval length of each Hanning window of N+1 Hanning windows. In Step 216, the sound processing unit 1044 utilizes the Overlap and Add algorithm with a scaling factor to strengthen or compress an interval length of each Hanning window of the N+1Hanning windows in the time domain to generate new digitized sound NDSo. In Step 218, the sound processing unit 1044 utilizes linear interpolation to perform upscaling on the new digitized sound NDSo for generating upscaled digitized sound LINDSo. In Step 219, the upscaled digitized sound LINDSo is filtered to generate filtered digitized sound FDSo. In Step 220, the filtered digitized sound FDSo is resampled to generate the processed sound PSo, whose length is the same as length of the digitized sound DSo. In Step 222, the processed sound PSo is outputted. For example, a user wants to convert a 1S sound signal to a sound signal with 2S length effect, so the sound processing unit 1044 extends an interval length of each Hanning window in the time domain according to the Overlap and Add algorithm. Then, the sound processing unit 1044 utilizes the linear interpolation and the resampling to generate the 1S processed sound PSo with the 2S length effect. Therefore, the sound processing unit 1044 can change male sound to female sound or change female sound to male sound according to the PSOLA algorithm.

In another embodiment, when the sound processing unit 1044 is integrated in a webcam driver, the sound processing unit 1044 can be realized by software, where the webcam driver is installed in the host 112.

Figure 3:
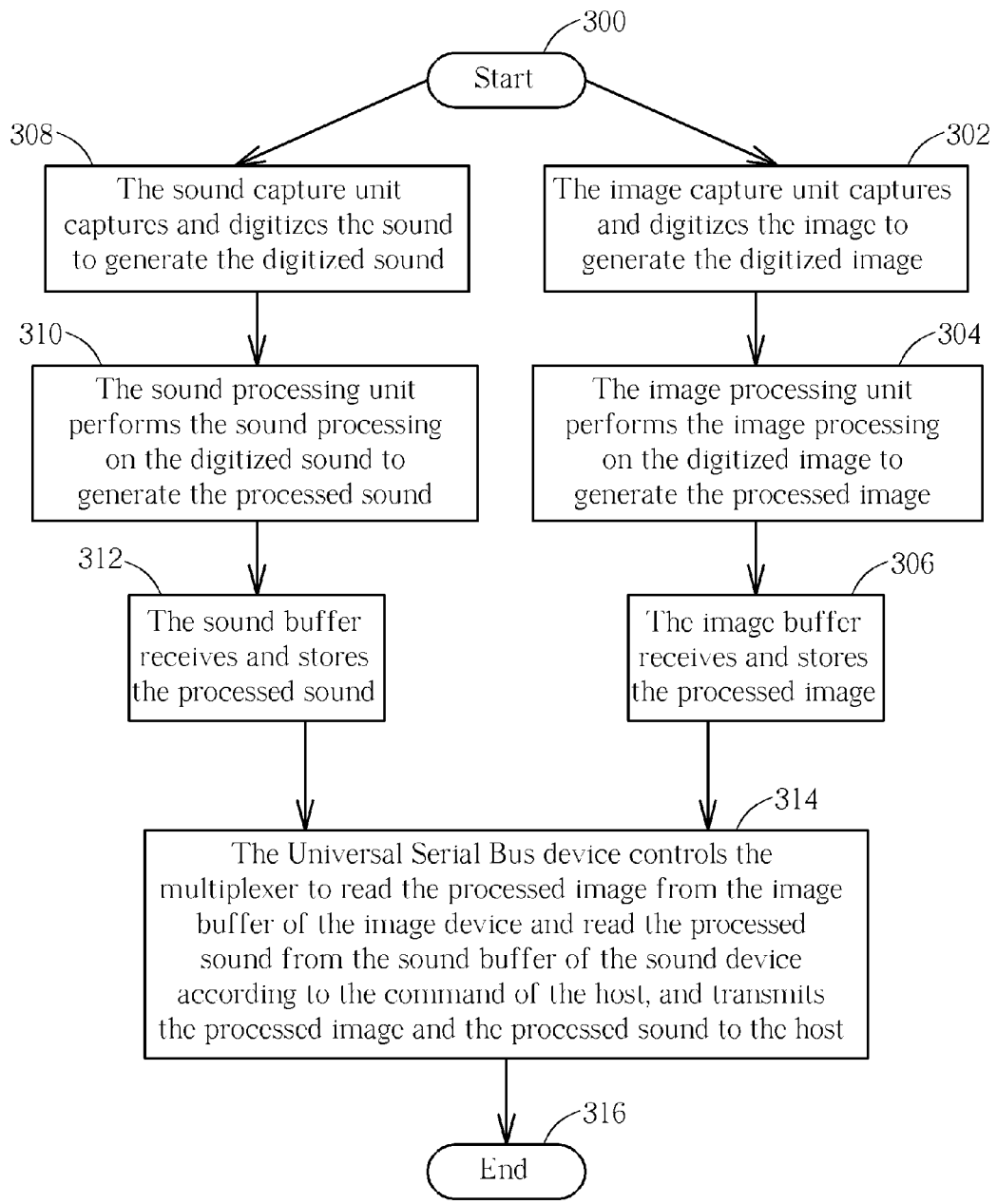
FIG. 3 is a flowchart illustrating a method of generating special sound effects by a webcam according to another embodiment.

Please refer to FIG. 3. FIG. 3 is a flowchart illustrating a method of generating special sound effects by a webcam according to another embodiment. The method in FIG. 3 is illustrated using the webcam 100 in FIG. 1. Detailed steps are as follows:

Step 300: Start.

Step 302: The image capture unit 1022 captures and digitizes the image IA to generate the digitized image DIA.

Step 304: The image processing unit 1024 performs the image processing on the digitized image DIA to generate the processed image PIA.

Step 306: The image buffer 1026 receives and stores the processed image PIA; go to Step 314.

Step 308: The sound capture unit 1042 captures and digitizes the sound So to generate the digitized sound DSo.

Step 310: The sound processing unit 1044 performs the sound processing on the digitized sound DSo to generate the processed sound PSo.

Step 312: The sound buffer 1046 receives and stores the processed sound PSo.

Step 314: The Universal Serial Bus device 110 controls the multiplexer 106 to read the processed image PIA from the image buffer 1026 of the image device 102 and read the processed sound PSo from the sound buffer 1046 of the sound device 104 according to the command of the host 112, and transmits the processed image PIA and the processed sound PSo to the host 112.

Step 316: End.

In Step 302, the image capture unit 1022 is a complementary metal oxide semiconductor image sensor or a charge coupled device image sensor. In Step 304, the image processing includes scaling, adjusting color, adjusting luminance, adjusting resolution, noise cancellation, edge enhancement, interpolation and/or adjusting contrast. In Step 308, the sound capture unit 1042 is a combination of an analog microphone and an analog-to-digital converter, or a digital microphone. In Step 310, the sound processing includes sound mixing (as shown in FIG. 2A), adding echoes (as shown in FIG. 2B) and/or pitch shift (as shown in FIG. 2C). In Step 314, the Universal Serial Bus controller 1102 of the Universal Serial Bus device 110 can control the multiplexer 106 to read the processed image PIA from the image buffer 1026 of the image device 102 and read the processed sound PSo from the sound buffer 1046 of the sound device 104 according to the command of the host 112, and the Universal Serial Bus interface 1104 of the Universal Serial Bus device 110 can transmit the processed image PIA and the processed sound PSo to the host 112.

To sum up, the webcam capable of generating the special sound effects and the method of generating the special sound effects by the webcam utilize the sound processing unit to perform the sound processing on the sound captured and digitized by the sound capture unit to generate sound with the special sound effects. The sound processing includes the sound mixing, the adding echoes and/or the pitch shift. Therefore, whether the host supports the special sound effects or not, the present invention can add the special sound effects for the user to have more fun when the user transmits real-time images and real-time sound.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A webcam capable of generating special sound effects, the webcam comprising:
   an image device for capturing and processing an image to generate a processed image, and storing the processed image;
   a sound device for capturing and processing sound to generate a processed sound, and storing the processed sound, wherein the sound device comprises:
      a sound capture unit for capturing and digitizing the sound to generate a digitized sound, wherein the digitized sound is real-time sound;
      a sound processing unit for performing sound processing on the digitized sound to generate the processed sound, wherein the sound processing comprises a sound mixing, the sound processing unit multiplies the digitized sound by a first weight to generate a first sound and multiplies a non-real time digitized sound by a second weight to generate a second sound, and the sound processing unit executes the sound mixing on the first sound and the second sound to output the processed sound; and
      a sound buffer coupled to the sound processing unit for receiving and storing the processed sound;
   a multiplexer coupled to the image device and the sound device for receiving the processed image and the processed sound;
   a microprocessor coupled to the image device and the sound device for controlling the image device and the sound device; and
   a Universal Serial Bus device coupled to the multiplexer and the microprocessor for controlling the multiplexer to read the processed image from the image device and read the processed sound from the sound device according to a command of a host, and transmitting the processed image and the processed sound to the host.

2. The webcam of claim 1, wherein the image device comprises:
   an image capture unit for capturing and digitizing the image to generate a digitized image;
   an image processing unit coupled to the image capture unit for performing image processing on the digitized image to generate the processed image; and
   an image buffer coupled to the image processing unit for receiving and storing the processed image.

3. The webcam of claim 2, wherein the image processing comprises scaling, adjusting color, adjusting luminance, adjusting resolution, noise cancellation, edge enhancement, interpolation and/or adjusting contrast.

4. The webcam of claim 2, wherein the image capture unit is a complementary metal oxide semiconductor image sensor (CMOS image sensor).

5. The webcam of claim 2, wherein the image capture unit is a charge coupled device image sensor (CCD image sensor).

6. The webcam of claim 1, wherein the non-real time digitized sound is pre-built into the sound processing unit or pre-captured by the sound capture unit at another time which is different from that of the real-time digitized sound.

7. The webcam of claim 1, wherein the sound processing further comprises adding echoes and/or pitch shift.

8. The webcam of claim 1, wherein the sound processing unit is integrated in a webcam driver.

9. The webcam of claim 1, wherein the sound capture unit is a combination of an analog microphone and an analog-to-digital converter.

10. The webcam of claim 1, wherein the sound capture unit is a digital microphone.

11. The webcam of claim 1, wherein the microprocessor controls the image device and the sound device according to firmware stored in the microprocessor.

12. The webcam of claim 1, wherein the Universal Serial Bus device comprises:
   a Universal Serial Bus controller for controlling the multiplexer to read the processed image from the image device and read the processed sound from the sound device according to the command of the host; and
   a Universal Serial Bus interface coupled to the Universal Serial Bus controller for transmitting the processed image and the processed sound to the host.

13. A method of generating special sound effects by a webcam, wherein the webcam comprises an image device, a sound device, a multiplexer, a microprocessor, and a Universal Serial Bus device, wherein the sound device comprises a sound capture unit, a sound processing unit, and a sound buffer, the method comprising:
   the image device capturing and processing an image to generate a processed image, and storing the processed image;
   the sound capture unit capturing and digitizing sound to generate a digitized sound, wherein the digitized sound is real-time sound;
   the sound processing unit performing sound processing on the digitized sound to generate a processed sound, wherein the sound processing comprises a sound mixing, the sound processing unit multiplies the digitized sound by a first weight to generate a first sound and multiplies a non-real time digitized sound by a second weight to generate a second sound, and the sound processing unit executes the sound mixing on the first sound and the second sound to output the processed sound;
   the sound buffer receiving and storing the processed sound;
   the multiplexer receiving the processed image and the processed sound; and
   the Universal Serial Bus interface controlling the multiplexer to read the processed image from the image device and read the processed sound from the sound device, and transmitting the processed image and the processed sound to a host according to a command of the host.

14. The method of claim 13, wherein capturing and processing the image to generate the processed image, and storing the processed image comprises:

an image capture unit capturing and digitizing the image to generate a digitized image;

an image processing unit performing image processing on the digitized image to generate the processed image; and an image buffer receiving and storing the processed image.

15. The method of claim 14, wherein the image processing comprises scaling, adjusting color, adjusting luminance, adjusting resolution, noise cancellation, edge enhancement, interpolation and/or adjusting contrast.

16. The method of claim 13, wherein the non-real time digitized sound is pre-built into the sound processing unit or pre-captured by the sound capture unit at another time which is different from that of the real-time digitized sound.

17. The method of claim 16, wherein the sound processing further comprises adding echoes and/or pitch shift.

* * * * *